(12) United States Patent
Sato et al.

(10) Patent No.: US 7,506,608 B2
(45) Date of Patent: Mar. 24, 2009

(54) HINGE MECHANISM

(75) Inventors: Hitoshi Sato, Tokyo (JP); Yasuhiro Mitsui, Abiko (JP); Minoru Ohiraki, Chiba (JP); Sakae Higano, Saitama (JP)

(73) Assignee: Mitsubishi Steel Mfg. Co., Ltd., Tokyo (JP)

( * ) Notice: Subject to any disclaimer, the term of this patent is extended or adjusted under 35 U.S.C. 154(b) by 0 days.

(21) Appl. No.: 10/542,667

(22) PCT Filed: Oct. 12, 2004

(86) PCT No.: PCT/JP2004/015341

§ 371 (c)(1),
(2), (4) Date: Jul. 18, 2005

(87) PCT Pub. No.: WO2005/040623

PCT Pub. Date: May 6, 2005

(65) Prior Publication Data
US 2006/0064850 A1    Mar. 30, 2006

(30) Foreign Application Priority Data
Oct. 28, 2003    (JP) .............................. 2003-367579

(51) Int. Cl.
*E05D 11/10*    (2006.01)
(52) U.S. Cl. ........................................ 116/330; 16/303
(58) Field of Classification Search .................... 16/303,
16/330, 327, 334, 297, 374, 367; 455/575.1,
455/575.3, 90.3; 379/433.13; 361/680–683;
248/917–921
See application file for complete search history.

(56) References Cited

U.S. PATENT DOCUMENTS

| 803,747 | A | * | 11/1905 | Elvin | 16/330 |
|---|---|---|---|---|---|
| 5,398,378 | A | * | 3/1995 | Lin | 16/303 |
| 5,923,751 | A | * | 7/1999 | Ohtsuka et al. | 379/433.13 |
| 6,070,298 | A | * | 6/2000 | Sorimachi | 16/330 |
| 6,665,906 | B2 | * | 12/2003 | Li | 16/330 |
| 6,804,861 | B2 | * | 10/2004 | Hsu | 16/366 |
| 6,886,221 | B2 | * | 5/2005 | Minami et al. | 16/324 |
| 6,948,217 | B2 | * | 9/2005 | Higano et al. | 16/303 |
| 2003/0153284 | A1 | | 8/2003 | Minami et al. | |

FOREIGN PATENT DOCUMENTS

| EP | 1 338 811 A1 | 8/2003 |
|---|---|---|
| JP | 10-317779 | 12/1998 |
| JP | 2002-155923 | 5/2002 |
| JP | 2002-206520 | 7/2002 |
| JP | 2002-310129 | 10/2002 |
| JP | 2003-304316 | 10/2003 |

* cited by examiner

*Primary Examiner*—Robert J Sandy
*Assistant Examiner*—Ruth C Rodriguez
(74) *Attorney, Agent, or Firm*—Flynn, Thiel, Boutell & Tanis, P.C.

(57) ABSTRACT

A hinge mechanism that generates a stress at the start and end points of arbitrary opening and closing range can be constructed by causing one cam set of two cam sets in which a rotating cam and a fixed cam engage only once in 360° rotation to generate a stress at the start point of the rotating range or opening and closing range of the hinge mechanism, and causing the other cam set to generate a stress at the end point of the rotating or opening and closing range. The hinge mechanism of the present invention achieves durability, good feeling, and size and weight reduction.

3 Claims, 8 Drawing Sheets

HINGE MECHANISM

TECHNICAL FIELD

The present invention relates to a hinge component which is used in folding or rotating mechanisms for electronic devices such as portable phones, laptop computers, electronic notebooks (PDA), DVD monitors, and remote controls.

BACKGROUND ART

Almost all conventional mechanisms of two-shaft hinges which create sliding friction torque, click torque, or stress on the rotational shaft involve pressing one or more cam sets with a spring to create a sliding friction torque, click torque or stress (Japanese Patent Publication No. 2002-206520).

Figure 8:
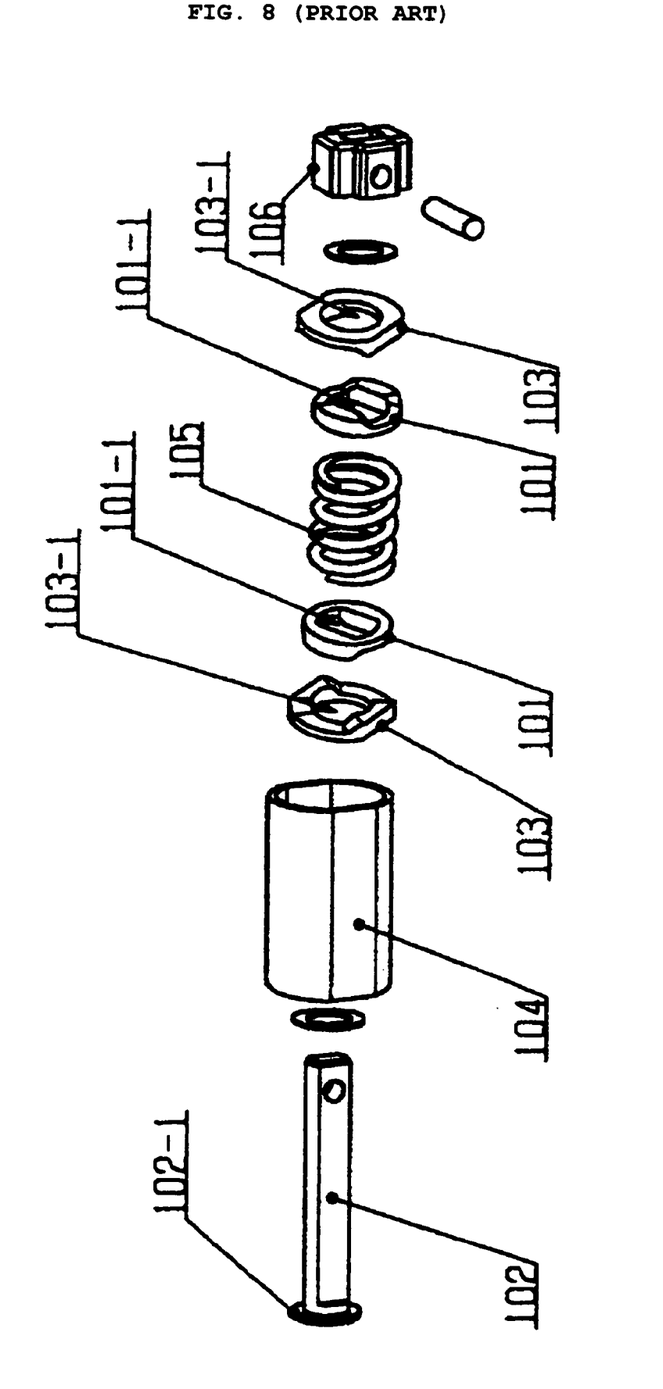
FIG. 8 is an assembly drawing showing an example of the conventional hinge mechanism.

FIG. 8 shows an example of a conventional hinge mechanism. Hereinafter, hinge mechanisms for opening and closing will be described. A fixed cam 101 is positioned such that an opening/closing shaft 102 is inserted therein, and by engaging a hole 101-1 of the fixed cam 101 with the shape of the opening/closing shaft 102, the fixed cam 101 is not able to rotate around the opening/closing shaft 102 but it is able to slide in the axial direction of opening/closing shaft 102. A rotating cam 103 is positioned so as not to rotate around the opening/closing shaft with regards to a case 104 by engaging the outside shape of the rotating cam 103 with the inside cross-sectional shape of the case 104, and so as to freely rotate around opening/closing shaft 102 by the circular shape of a hole 103-1 through which the opening/closing shaft 102 is inserted into rotating cam 103. Coil spring 105 is provided between the two fixed cams 101 and the one coil spring drives two pairs of the combination (cam set) of the rotating cam 103 and the fixed cam 101. One end of the opening/closing shaft 102 has a flange 102-1 to prevent disassembly and a mounting head 106 is attached to the other end. The hinge mechanism is constructed by connecting the case 104 to a first member and a head 106 with a second member. Here, the cam which is not able to rotate with regards to the opening/closing shaft is known as a fixed cam, and the cam which is able to rotate is called the rotating cam.

Figure 9:
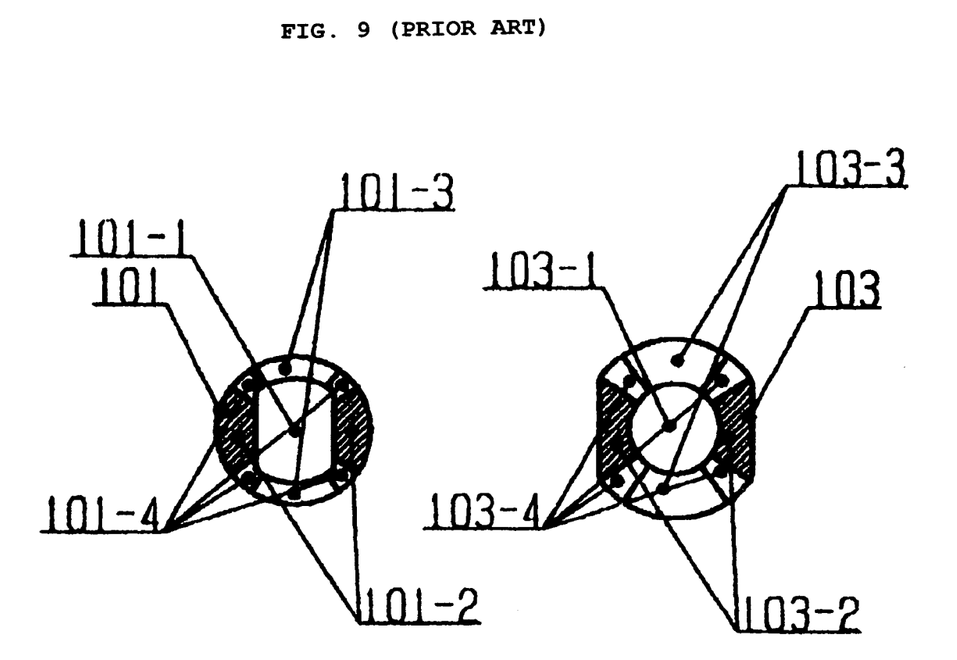
FIG. 9 is a drawing showing the cam surface configuration of a cam which is used in a conventional hinge mechanism.

FIG. 9 shows the shape of the cam surface of the fixed cam 101 and the rotating cam 103. The uneven configuration of the cam is usually determined in accordance with the movement range of the device which uses the hinge, and this drawing shows an example of the cam surface of a hinge for a device which opens and closes through a range of between approximately 160° and 170° such as a portable phone. Each cam receives a load from the coil spring 105, and while the protruding region 101-2 of fixed cam 101 and the protruding region 103-2 of the rotating cam 103 are in contact, a sliding torque is generated in the intermediate opening and closing movement range. When the protrusions and recesses of the fixed cam 101 and the rotating cam 103 begin to engage and the slopes 101-4, 103-4 are in contact, the load from the coil spring 105 is converted to a rotational force then a stress for rotation is caused. When the protrusions and recesses of the fixed cam 101 and the rotating cam 103 are completely engaged, the rotational force induced by the load of the spring is reduced, then only the contact force between cam 101 and cam 103 will remain. With standard specifications which have a click generating (absorbing) mechanism, a restricting mechanism for opening and closing is provided between a first and second member, thereby, the designated opening and closing range before the region where rotational forces are eliminated is determined.

The cam shape used for a conventional hinge mechanism is composed such that the cam set will engage in two or more locations of protrusions and recesses as shown in FIG. 9 in order to improve the efficiency of converting the load of the coil spring into a force in the rotational direction at both rotating cam 101 and fixed cam 103. Because the protrusions and recesses are engaged in two or more locations and the protrusions and recesses completely engage two times within an opening and closing angle of 180°, for devices which have an opening and closing range of not less than 180°, a clicking feel is generated by the unnecessary engagement of the cam set across the opening and closing range. As a result, a hinge mechanism in which the first member and second member generate a stress on both ends of the opening and closing range and an excessive click feel is not caused by the engagement of the cams in the opening and closing region cannot be realized. Furthermore, with an actual device, extra room is required in order to generate the stress, therefore, often this mechanism cannot be applied to devices which have an opening and closing range of not more than 180°. Consequently, for devices which require an opening and closing range of approximately 180° or greater, a hinge mechanism which uses a cam cannot be utilized, and this brings a result that a stress cannot be generated at both ends of the opening and closing range or the size of the devices increases by adding a complicated pressing or a lock mechanism.

DISCLOSURE OF THE INVENTION

The problem to be solved by the invention is to provide a hinge component which can realize durability, excellent feeling, size and weight reduction, for portable phones and laptop computers which are required to be even smaller and lighter.

The invention provides a hinge mechanism in a hinge which causes a first member and a second member to perform free rotational movement or opening and closing movement, and exerts a stress between the first member and the second member at a start point and an end point of the movement range, wherein the hinge mechanism comprises a spring and two or more cam sets, two cam sets of the cam sets have a cam structure in which the cam engages one time through a rotating range of 360°, and one cam set of the two applies a stress at the start point and the other cam set applies a stress at the end point.

The invention provides a hinge mechanism having a cam set to retain the rotational or opening and closing condition of the first member and the second member in an intermediate movement range.

The invention provides a hinge mechanism, wherein a stopper member to restrict the movement range is added.

The invention provides a two-shaft hinge with a rotational shaft and an opening/closing shaft, wherein a hinge mechanism is positioned on at least one shaft of the two-shaft hinge, as a torque generating unit of the rotational shaft or opening/closing shaft.

BEST MODE FOR CARRYING OUT THE INVENTION

Embodiments of the present invention will be described below based on the drawings.

Figure 1:
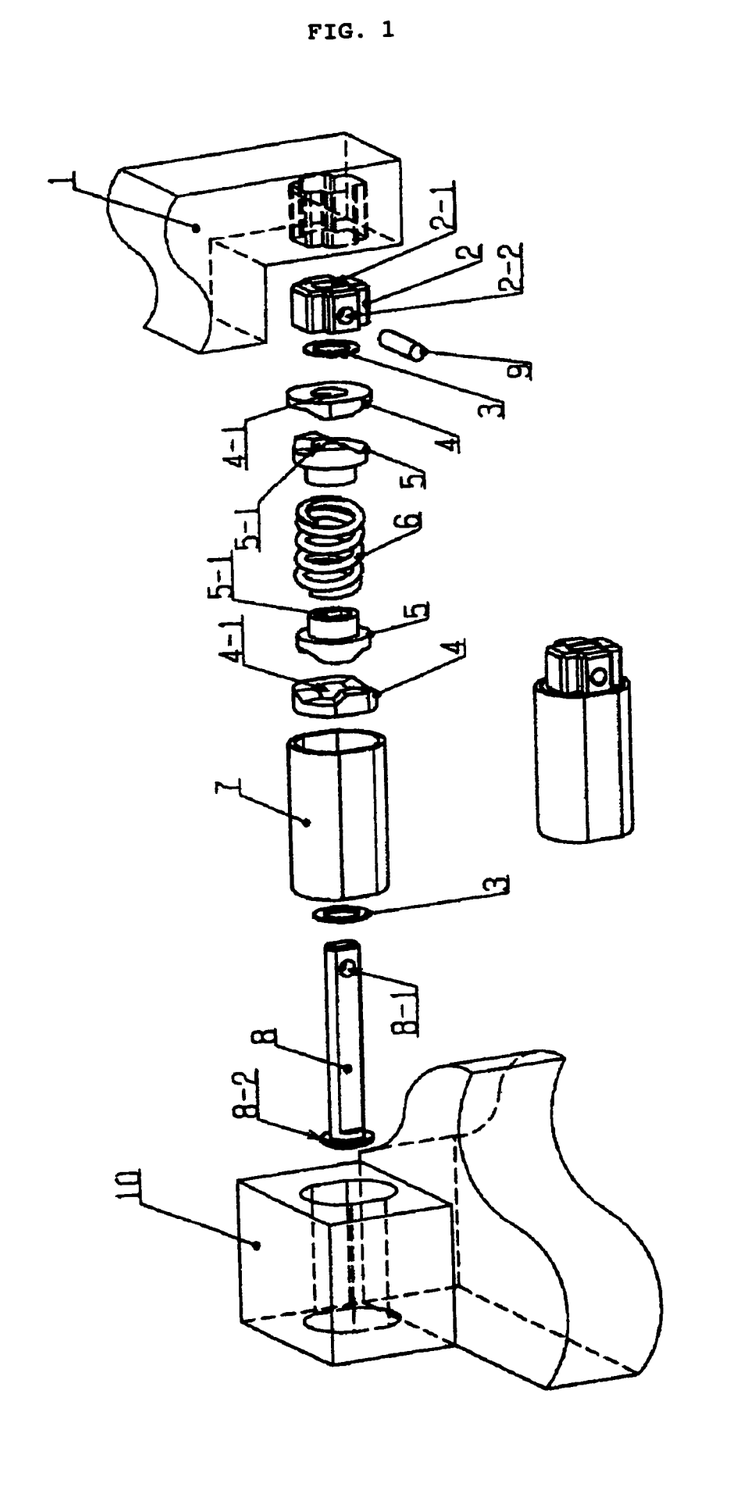
FIG. 1 is a component drawing and a final drawing of the components relating to a first embodiment.

FIG. 1 shows the componential constitution and the appearance of an assembled hinge of an embodiment of a hinge mechanism of the present invention. The following is an explanation of a hinge mechanism for opening and closing. Of course this hinge may also be used as a hinge for a rotational shaft if the shaft is replaced. The hinge is composed of, from the right side of FIG. 1, first member 1, head 2, lubricating member 3, rotating cam 4, fixed cam 5, coil spring 6, case 7, opening/closing shaft 8, fastening pin 9, and second member 10. The first member 1 engages with and is fixed at the head 2 while the second member 10 engages with and is fixed at the case 7, to form a hinge mechanism which can open and close the first member 1 and second member 10.

Here, the first member can be considered to be a housing member which accommodates a main unit or main component of an electronic device, and the second member can be assumed to be a display device of an electronic device or a protective member such as a lid or cover. For instance, in the case of a folding type portable phone, the first member is an operating side on which a keyboard or the like is installed, and the second member is an image viewing side where a liquid crystal monitor is installed. Moreover, for devices to which a liquid crystal monitor is attached such as laptop computers and electronic notebooks, the first member is a housing side member where a keyboard or the like is provided and the second member is a monitor side member.

The head 2 is made from a metal or resin, has a hole 2-1 for the opening/closing shaft 8 to be inserted and fastened, and has a hole 2-2 to be passed through by a fastening pin 9 which fixes the head 2 in order to prevent it from releasing due to the load from the coil spring 6. The outer shape of the head 2 should be a shape other than a circle, such as a square, hexagon, ellipse, cross, or star to prevent the head 2 and the first member 1 from rotating. The lubricating member 3 is made from a thin plate of resin or metal, and is provided in order to prevent wear caused by friction between the components other than between the cams. However, if wear and friction doesn't bring problems thanks to the effects of the material or the like of each member, or if wear can be prevented by applying grease to these locations, these lubricating members 3 may be omitted.

The rotating cam 4 and the fixed cam 5 are formed by a pressing, a sintering, or a machining or the like. The rotating cam 4 has a nearly oval cross-sectional configuration with two straight sections in a circle (portions of the outside of a tube are shaved off along the center axis to form two flat planes), engages with the shape of the inside of the case 7 to stop rotation with respect to the case, and the hole 4-1, through which the opening/closing shaft 8 is inserted into the rotating cam 4, is round so that the opening/closing shaft 8 can freely rotate with respect to the rotating cam 4. The outer shape of the fixed cam 5 is usually nearly circular with a size which allows for free rotation inside the case 7, and hole 5-1, through which the opening/closing shaft 8 is inserted into the fixed cam 5, has a nearly oval shape with two straight sections in a circle and engages with the opening/closing shaft 8 to prevent rotation with respect to the opening/closing shaft 8, or in other words, rotates together with the opening/closing shaft 8.

The coil spring 6 is positioned in order to apply a load to the rotating cam 4 and the fixed cam 5, but if there are size restrictions on the hinge mechanism or if a large stress and friction torque is necessary, plate springs such as disc springs or wave springs may also be used. The case 7 is made from a metal or resin, and the inside shape has a nearly oval cross-section with two straight sections of a circle in order to engage with the outside shape of the rotating cam 4. The outside shape of the rotating cam 4 and the inside shape of the case 7 may be a configuration other than nearly oval so long as relative rotation is not possible. Furthermore, the outer shape of the case 7 may have a nearly oval cross-section which is similar to the inside shape, but if another shape is used, it must be a shape other than a circle such as a square, hexagon, ellipse, cross, or star in order to stop rotation of the second member. However, it is also possible to use a rotation preventing technique that a recess or protrusion is provided in a portion of the outer shape to engage with a protrusion or recess provided on the side of the second member. The opening/closing shaft 8 is metal and formed by a machining, a pressing, or a sintering or the like, one end has a hole 8-1 to fix the head 2 and the other end has a flange 8-2 to prevent disassembly. The cross-sectional configuration of the opening/closing shaft 8 is a configuration which has a nearly oval cross-section the same as the hole 5-1 of the fixed cam 5 in order to engage with the hole 5-1 of the fixed cam 5 to prevent rotation of the fixed cam 5 with regards to the rotational shaft. The cross-sectional configuration of the hole 5-1 of the fixed cam 5 and the opening/closing shaft 8 may be a shape other than nearly oval so long as the shape prevents relative rotation.

Figure 2:
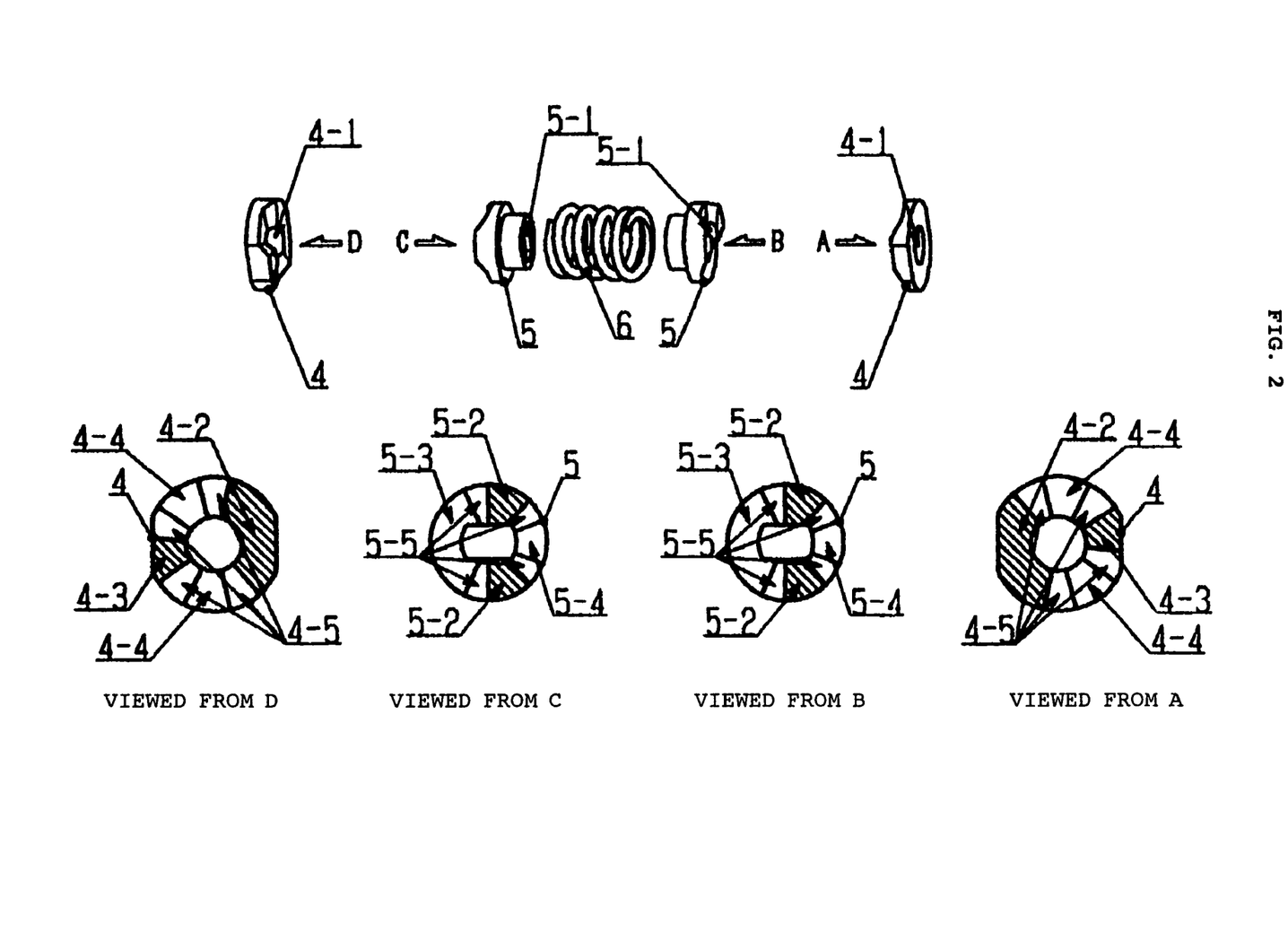
FIG. 2 is a drawing showing the cam position and cam configuration relating to the first embodiment.

FIG. 2 shows the shape of the cam surfaces of the rotating cam 4 and the fixed cam 5 and the cam arrangement for the present example. The cam surface of the rotating cam 4 has protrusions 4-2, 4-3 in two locations and recesses 4-4 in two locations, the protrusions (4-2, 4-3) differ in size, and the protrusions are indicated with hatching in the drawing. A slope 4-5 is formed between these respective protrusions and recesses. The cam surface of the fixed cam 5 similarly has two protrusions 5-2 and two recesses 5-3, 5-4, and the two recesses differ in size. A slope 5-5 is formed between these respective protrusions and recesses. The rotating cam 4 and the fixed cam 5 engage only when the large protrusion 4-2 of the rotating cam 4 and the large recess 5-3 of the fixed cam come to the same location, so the rotating cam 4 and the fixed cam 5 engage only once per revolution, at which time a stress will be generated between the first member 1 and the second member 10. In this example, since two sets of fixed cam and rotating cam assemblies (cam sets) are positioned on both sides of the coil spring 6 and each cam set engages only once per revolution, if the phase of each cam set engaging is adjusted by the configuration of the cam surface or the cam arrangement, then a stress can be exerted at the start point of the opening and closing range by one cam set on one side and another stress can be exerted at the end point of the opening and closing range by the other cam set. Therefore, even if the opening and closing range of the first member 1 and the second member 10 is not less than 180°, the stress can be generated at two arbitrary start and end points of the opening and closing range. Note, in the cam surface example of FIG. 2, a constitutional example of a hinge mechanism such that a stress can be generated at the start and end points of an opening and closing range of approximately 180° is shown.

Figure 3:
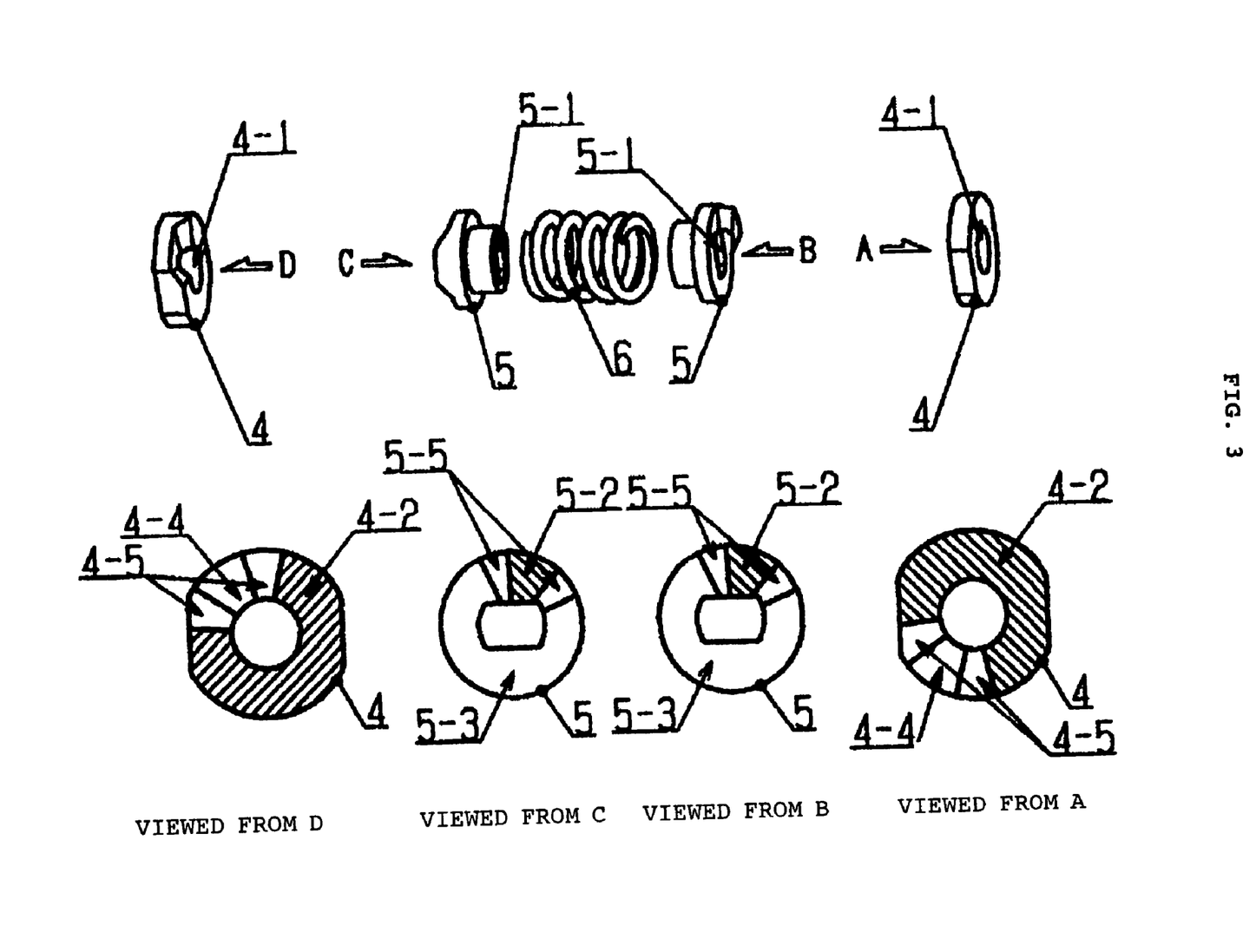
FIG. 3 is a drawing showing the cam position and cam configuration relating to a second embodiment.

FIG. 3 shows a cam surface configuration for a fixed cam 5 and a rotating cam 4 and a cam arrangement which relates to a second embodiment for the hinge mechanism of the present invention. The cam surface of the rotating cam 4 has a protrusion 4-2 in one location and a recess 4-4 in one location, and a slope 4-5 is formed between the protrusion and the recess. The cam surface of the fixed cam 5 has a protrusion 5-2 located in one place and a recess 5-3 located in one place, and a slope 5-5 is formed between the protrusion and the recess. Each of the cam sets has only one set of protrusion and recess and engages only once per revolution to generate a stress between the first member 1 and the second member 10. In this embodiment, since two sets of fixed cam and rotating cam assemblies (cam sets) are positioned on both sides of the coil spring 6 and each cam set engages only once per revolution, if the phase of each cam set engaging is adjusted by the configuration of the cam surface, then a stress can be exerted at the start point of the opening and closing range by one cam set on one side, and a stress can be exerted at the end point of the opening and closing range by the other cam set. Therefore, even if the opening and closing range of the first member 1 and the second member 10 is not less than 180°, a stress can be generated at two arbitrary start and end points of the opening and closing range. The embodiment of FIG. 3 has one engaging location for each cam set then the efficiency of converting the load of the coil spring 6 into a stress in the direction of rotation is lesser, but, the embodiment has the characteristics that the structure of the cam surface is simple and the cam is easy to machine.

These embodiments are only examples and other structures which drive two cam sets can be conceived. For instance, a variation that a member with the same function as the head 2 is monolithically formed on the end of the opening/closing shaft 8, flange 8-2 is eliminated and a stop ring and crimp are used to fasten it, is possible.

Figure 4:
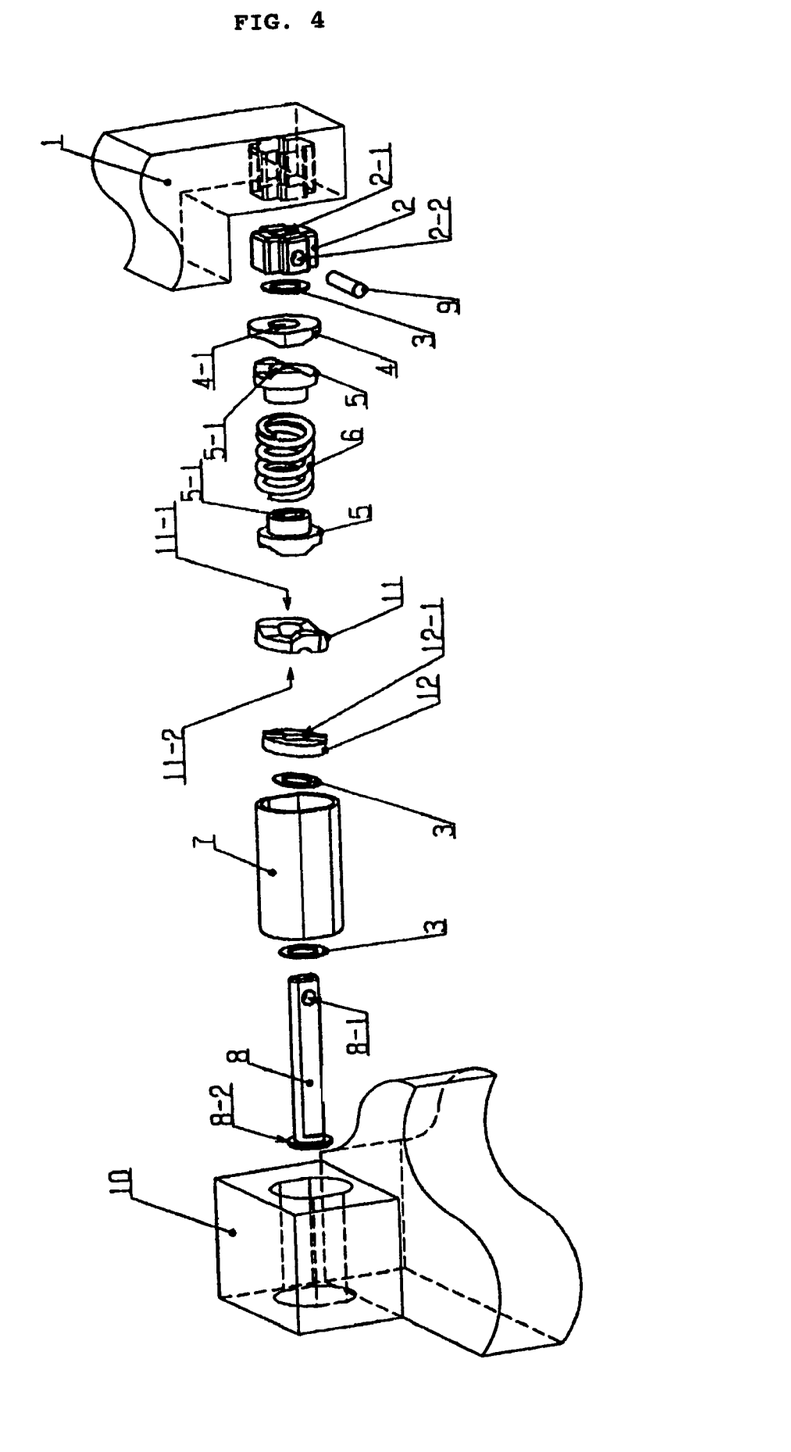
FIG. 4 is a component drawing of the components relating to a third embodiment.

FIG. 4 shows a structure of a component which relates to a second embodiment for the hinge mechanism of the present invention. In contrast to the embodiment of FIG. 3, a new cam is formed on the front and back surfaces 11-1, 11-2 of one rotating cam 11, and a fifth cam 12 is additionally provided. The fifth cam 12 has the same near oval cross-sectional configuration as the cross-sectional configuration of the opening/closing shaft 8 so as to stop relative rotation with the opening/closing shaft 8 in the same way as the fixed cam. The fifth cam 12 rotates relative to the case 7 then a lubricating member 3 is added because friction and wear will occur between them. The lubricating member 3 is provided to prevent wear of the members caused by friction other than between the cams, but if friction and wearing are not problems thanks to the effect of the material of the members or the like, or if wearing can be prevented by applying grease to these locations, the lubricating member 3 can be omitted. In the embodiment shown in FIG. 1, the cam which engages with a cam corresponding to the fifth cam 12 is the rotating cam 4 on the left side of FIG. 1. On the other hand, in the present embodiment, a new cam surface 11-2 is additionally formed on the opposite surface of the rotating cam 11, so that a third cam set can be made by the new cam surface 11-2 of the rotating cam 11 and the fifth cam 12.

Figure 5:
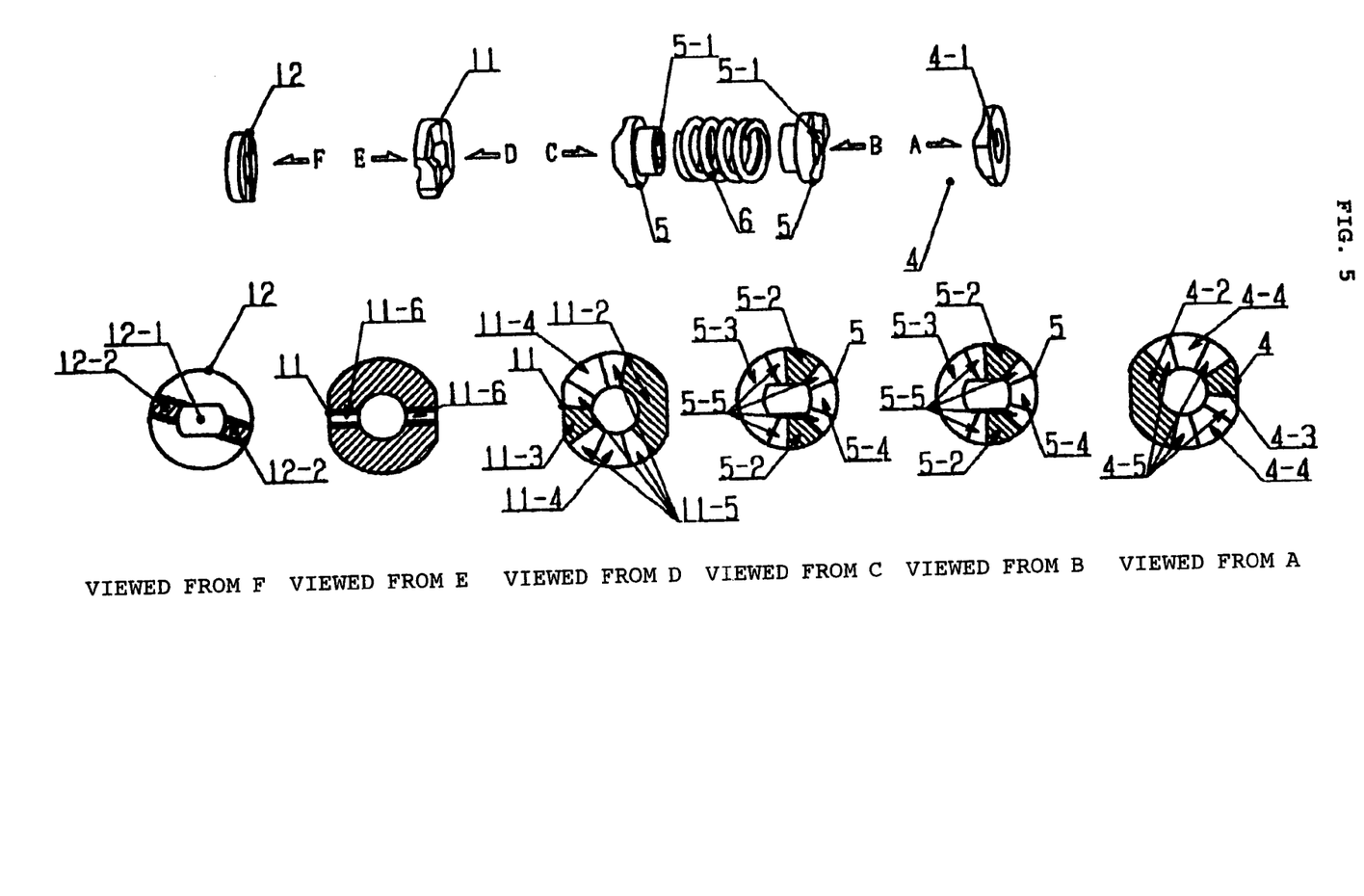
FIG. 5 is a drawing showing the cam position and cam configuration relating to the third embodiment.

FIG. 5 shows the configuration of the cam surfaces of each cam and the arrangement of the cams for the embodiment shown in FIG. 4. Since the configuration other than the surfaces of the cams other than the third cam set is identical to the cam configuration of FIG. 2, a description is omitted. The rotating cam 11 has protrusions 11-2, 11-3, recesses 11-4, a slope 11-5 formed on the cam surface 11-1, and two recesses 11-6 on the new cam surface 11-2. The fifth cam 12 has protrusions 12-2 at two locations. The protrusions and recesses of cams 11, 12 engage at an intermediate position of 160° within the opening and closing range of 180° of the hinge function, thus showing an example that the opening condition can be retained across the opening and closing range. Here the engagement which maintains the intermediate open condition was at 160°, but this shows that this structure enables the provision of a cam set which can retain an intermediate open condition at any position regardless to the cam set which creates a stress at the start and end points of the opening and closing range.

Figure 6:
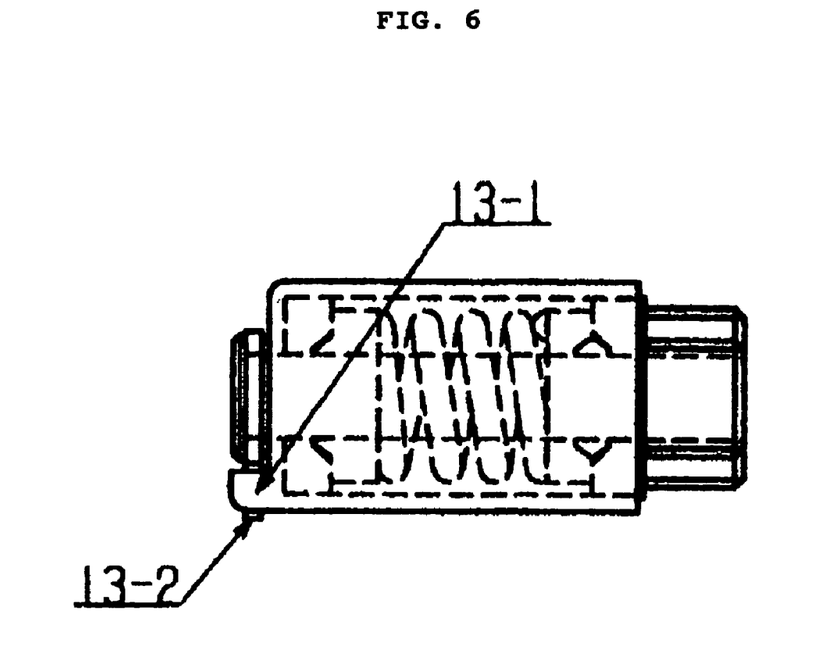
FIG. 6 is a component drawing relating to a fourth embodiment.

FIG. 6 shows a structure of an embodiment of the hinge mechanism of the present invention. An example that a function to stop rotation of not less than 360° is added to a hinge mechanism by furnishing stoppers 13-1, 13-2 for opening and closing angle restriction is shown. Here, protrusions at the edge of the opening/closing shaft and the case are provided as a stopper mechanism, and in the mechanism, as the opening/closing shaft rotates, it will strike the protrusion of the case of the opening/closing shaft and the rotation past that point is prohibited. Alternatively, two protrusions may be formed either on the case or on the opening/closing shaft, or a protruding region may be formed on the outer circumference, thereby, the range between the two protrusions or the range other than the protruding region may be an angle restricted range which is possible to rotate.

By adding the stoppers which restrict the opening and closing angle to the hinge mechanism, an opening and closing restricting mechanism (stopper mechanism) is not necessary between the first member 1 and the second member 10, so a simplified device structure is possible.

Figure 7:
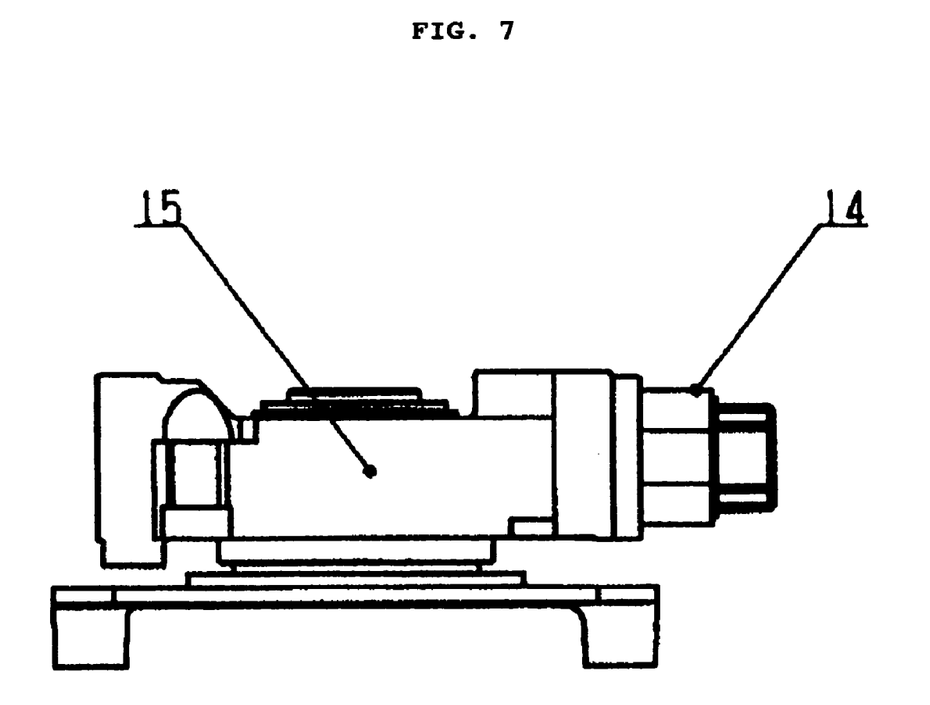
FIG. 7 is a component drawing relating to the fourth embodiment.

FIG. 7 shows the structure of an embodiment of the hinge mechanism of the present invention. By installing the hinge mechanism 14 of the present invention to the opening/closing shaft side of a two-shaft hinge 15, a two-shaft hinge which furnishes the hinge mechanism characterized in that one cam set exerts a stress at the start point of the opening and closing range and the other cam set provides a stress at the end point of the opening and closing range is obtained. Note, when constructing a two-shaft hinge, the hinge mechanism is not necessarily assembled only on the opening/closing shaft side, this hinge mechanism may be assembled on the rotational shaft side or on both the opening/closing shaft side and the rotational shaft side, depending on the conditions of use.

INDUSTRIAL APPLICABILITY

The invention shows an effect that a hinge mechanism having two or more cam sets in which a stress can be exerted at both the start and end points, even if the rotation or opening and closing range is not less than 180°, can be obtained by causing one cam set to apply a stress at the start point of the rotational or opening and closing range, and causing the other cam set to apply a stress at the end point.

The invention shows an effect that a hinge mechanism which can provide temporary retention at an operating angle at an intermediate position within the rotational or opening and closing range can be obtained, by adding a new cam set to the inventive hinge mechanism.

The invention shows an effect that restriction of the rotation or opening and closing range by the hinge mechanism itself is possible by adding a stopper to the inventive hinge mechanism.

The invention shows an effect that a two-shaft hinge which can exert a stress at the start and end points, even if the rotational range or opening and closing range is approximately 180° or greater, can be obtained by arranging the inventive hinge mechanism on at least one shaft of the two-shaft hinge as a unit which creates torque on the rotational shaft or on the opening/closing shaft of the two-shaft hinge which has rotational and opening/closing shafts.

The invention claimed is:

1. A hinge mechanism in a hinge which causes a first member and a second member to have free rotational movement or opening and closing movement and exerts a first stress between the first member and the second member at a rotational start point of a movement range and a second stress between the first member and the second member at a rotational end point of the movement range, the hinge mechanism comprising:
   a shaft;
   a spring; and
   two cam sets having the shaft inserted therethrough and having different phases from each other, each cam set having a cam structure comprising a protrusion provided in one member of the cam set and a recess provided in the other member of the cam set in which the protrusion and the recess of each cam set engage with each other only once as the cam set rotates through 360°,
   wherein the spring biases the two cam sets, and
   one of the two cam sets applies the first stress at the rotational start point by the spring bias and the other of the two cam sets applies the second stress at the rotational end point by the spring bias.

2. A hinge mechanism according to claim 1, further comprising a cam set to retain the rotational or opening and closing condition of the first member and the second member in an intermediate movement range.

3. A hinge mechanism according to claim 1, further comprising a stopper member for restricting the movement range.

* * * * *